(12) United States Patent
Schleit et al.

(10) Patent No.: US 10,810,184 B1
(45) Date of Patent: Oct. 20, 2020

(54) SYSTEMS FOR CONSISTENT MODIFICATION OF STORED VALUES

(71) Applicant: AMAZON TECHNOLOGIES, INC., Seattle, WA (US)

(72) Inventors: Andrew Christopher Schleit, Seattle, WA (US); Nicolas Valere Choumitsky, Seattle, WA (US); Sean Robert Connell, Seattle, WA (US); Aaron Ben Fernandes, Redmond, WA (US); Arjan Xeka, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 1264 days.

(21) Appl. No.: 14/573,571

(22) Filed: Dec. 17, 2014

(51) Int. Cl.
*G06F 16/00* (2019.01)
*G06F 16/23* (2019.01)

(52) U.S. Cl.
CPC ............... *G06F 16/2365* (2019.01)

(58) Field of Classification Search
CPC .................................. G06F 16/2365
See application file for complete search history.

(56) References Cited

U.S. PATENT DOCUMENTS

| | | | | |
|---|---|---|---|---|
| 5,133,075 A * | 7/1992 | Risch | ............... | G06F 16/2358 |
| 7,793,243 B1 * | 9/2010 | Becer | ............... | G06F 17/5031 |
| | | | | 716/108 |
| 2003/0126029 A1 * | 7/2003 | Dastidar | ......... | G06F 13/4059 |
| | | | | 710/306 |
| 2009/0179490 A1 * | 7/2009 | Nagao | .............. | G06F 1/266 |
| | | | | 307/31 |
| 2009/0217289 A1 * | 8/2009 | Onianwa | ......... | G06F 9/466 |
| | | | | 718/106 |
| 2011/0113031 A1 * | 5/2011 | Oliver | ............ | G06F 17/30489 |
| | | | | 707/737 |
| 2013/0159247 A1 * | 6/2013 | Engelko | ......... | G06F 17/30002 |
| | | | | 707/609 |
| 2014/0101278 A1 * | 4/2014 | Raman | ............. | G06F 12/0862 |
| | | | | 709/213 |

* cited by examiner

*Primary Examiner* — Usmaan Saeed
*Assistant Examiner* — Paul Kim
(74) *Attorney, Agent, or Firm* — Lindauer Law, PLLC

(57) ABSTRACT

Described are techniques for reducing inaccurate values in databases by managing the order in which processes are enqueued and executed. A modification process to modify a first value in a database may be received. A precomputation process that modifies values dependent on the first value may be enqueued prior to enqueuing of the modification process to ensure that the modification process does not occur if the precomputation process fails. The modification process may be executed prior to executing the precomputation process to ensure that the precomputation process acts to modify the dependent values using the modified version of the first value.

20 Claims, 7 Drawing Sheets

SYSTEMS FOR CONSISTENT MODIFICATION OF STORED VALUES

BACKGROUND

In database systems, one or more stored values may be calculated using other stored values. Therefore, if a first value in the database is modified, other values dependent on that first value must also be modified for the data in the database to remain accurate.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
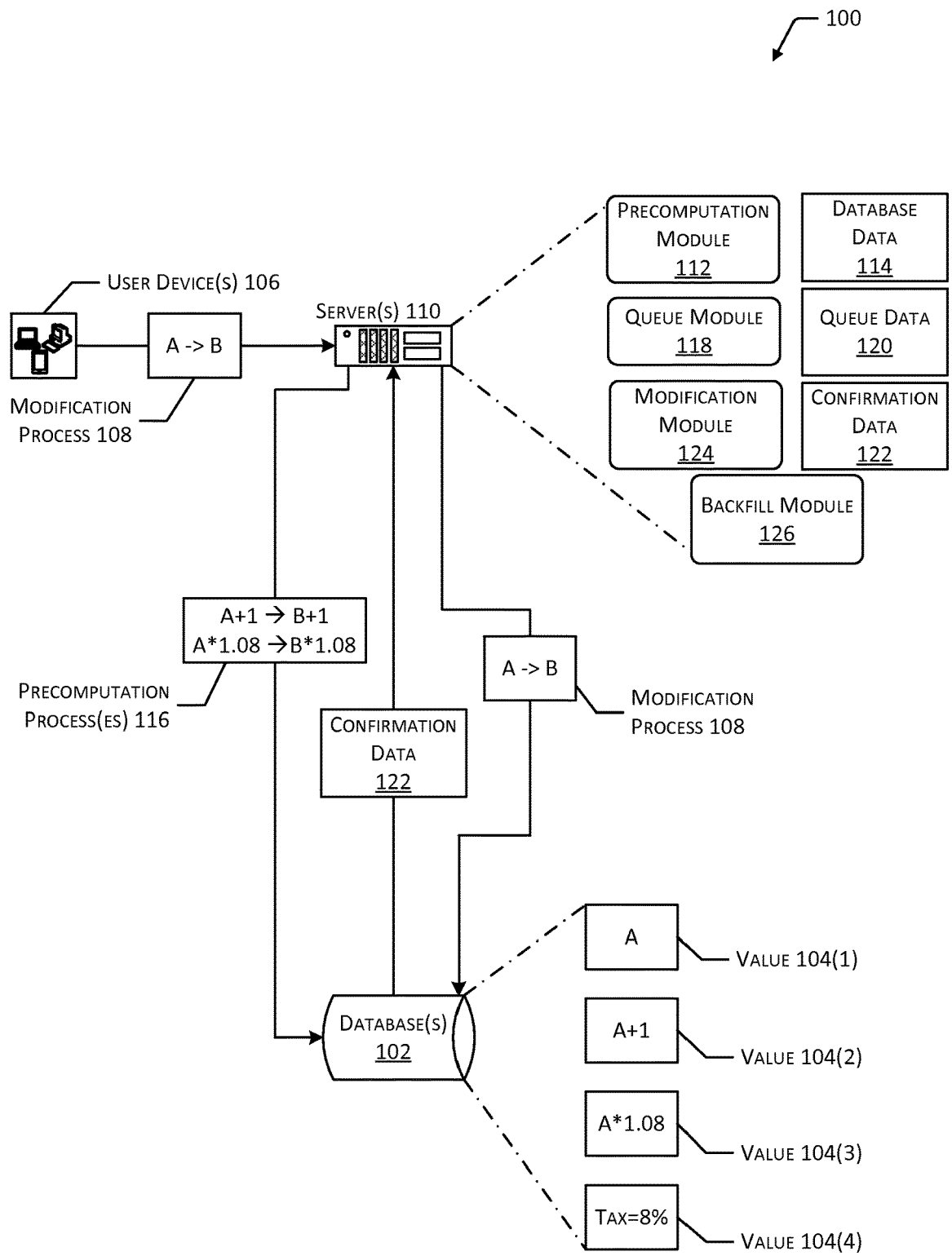
FIG. 1 depicts a system for enqueuing and executing processes to modify values in one or more databases.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include," "including," and "includes" mean including, but not limited to.

DETAILED DESCRIPTION

Databases and other types of data structures may be used to store one or more values (e.g., records, resources, and so forth) as well as the relationships between values. For example, a first value may be used to calculate one or more other values, which in turn, may be used to calculate additional values. As such, if one value in a database is modified, other values in the database may become inaccurate until recalculated using the modified value. To account for potential inaccuracies, some database systems recalculate values at the time they are accessed by a process. However, recalculation of values at the time of access may introduce latency to a user experience, especially if the calculations used to determine an accessed value are numerous or complex. In some cases, it may be desirable to "precompute" one or more values to facilitate future access thereto. For example, one or more values that depend from a modified value may be recalculated at or near the time that the modified value becomes available. Precomputing of the one or more values may enable an accurate value to be available immediately upon access.

A number of processes may attempt to access one or more values in a database at any given time, especially in large scale databases, such as those used by online merchants to contain items offered for sale by numerous venders. To retain integrity of the values in the database, resource locks may be used to prevent multiple processes from acting on the same value simultaneously. For example, to access a value, a process must first request access to a lock associated with the value. If the lock is currently granted to another process, the requesting process may be placed on a queue for eventual access to the value. As such, when other processes are accessing values in a database, it may not be possible to modify a value or to recalculate one or more of the values that depend upon a modified value at or near the time when the modification to the value is provided to the database. If a precomputation process fails to update a respective value, while an associated modification process successfully modifies a value, one or more values within the database may become inaccurate.

This disclosure describes techniques that may be used to process modification and precomputation processes in one or more databases or other types of data stores, while facilitating consistent execution and output of the processes. When a modification to a first value, stored in a computer-readable storage medium (CRSM), is received, one or more values that depend on the first value (e.g., that are calculated using the first value) may be determined. A precomputation process configured to modify the dependent values may be generated and enqueued for access to the CRSM. Because enqueuing of the precomputation process may fail, the modification to the first value may not be enqueued until confirmation data indicating the enqueuing of the precomputation process is received. For example, if the modification process were enqueued prior to enqueuing the precomputation process, a failure in enqueuing the precomputation process would result in the first value being updated, upon execution of the modification process, while the dependent values remain static, and therefore inaccurate. Therefore, confirming enqueuing of the precomputation process prior to enqueuing an associated modification process ensures that if the first value is updated, dependent values will also be updated. Further, if the precomputation process is enqueued prior to enqueuing of the modification to the first value and enqueuing of the modification fails, the precomputation process may calculate the dependent values based on the unmodified first value, thus not introducing inaccuracy. Therefore, implementations described herein may be used to ensure, e.g., based on received confirmation data, that a precomputation process has been enqueued prior to enqueuing of a related modification process.

In some implementations, the precomputation process may determine whether the first value has been modified prior to attempting to calculate values dependent on the first value. For example, a precomputation process may be configured to access a value associated with a modification process to determine whether that value has been modified. A modification process may assign a version identifier to the first value. Responsive to a determination that the version identifier has been assigned to the value, the precomputation process may be executed to modify the dependent values. If it is determined that the version identifier has not been assigned to the value, the precomputation process may fail or the precomputation process may be delayed for a length of time then subsequently retried. Subsequent to the length of time, if the precomputation process determines that the version identifier has not been assigned to the value, this may indicate that the modification process has failed, and the precomputation process may be executed using the unmodified first value without creating inaccuracy.

In some implementations, the precomputation process may have a version identifier associated therewith. If correspondence between the version identifier of the precomputation process and that of the modified value is determined, the precomputation process may be executed to modify the dependent values. For example, if the version identifier associated with the value is identical to or newer than the version identifier associated with the precomputation process, this may indicate that the modification process or a later process has updated the first value, and the precomputation process may be executed. If a lack of correspondence between the version identifier associated with the precomputation process and that associated with the first value is determined, execution of the precomputation process may be delayed for a length of time. For example, if the version identifier associated with the first value is older than that associated with the precomputation process, this may indicate that the first value has not yet been modified. Execution of the precomputation process may be delayed for a length of time corresponding to a process time associated with the modification process (e.g., an expected time after which the modification process may be completed). Subsequent to the length of time, if correspondence with the version identifier associated with the value is determined, the precomputation process may be executed using the modified value. If a lack of correspondence is determined, the precomputation process may be executed using the unmodified value, or the precomputation process may fail. The lack of correspondence subsequent to the length of time may indicate that the modification process has failed. Therefore, executing the precomputation process based on the unmodified value may not generate inaccuracies in the database. The modification process and any associated precomputation processes may be subsequently retried.

In some implementations, execution of a precomputation process may fail. If a modification process is successfully executed while a precomputation process fails, dependent values may become inaccurate. Therefore, the precomputation process may be retried until it has been successfully executed. For example, upon determination that execution of a precomputation process has failed, the precomputation process may be deferred for a length of time, and then retried. The length of time for which the precomputation process is deferred may increase (e.g., exponentially) with each successive time that the precomputation process is retried.

In some implementations, a first precomputation process may be enqueued, prior to a second precomputation process that is configured to act on the same values. When the second precomputation process is enqueued, correspondence between the values associated with the first and second precomputation processes may be determined, and the first precomputation process may be removed from the queue. Removal of duplicate processes from a queue may reduce redundancy and inefficiency while conserving time and computation resources. For example, because the second precomputation process was generated more recently than the first precomputation process, the second precomputation process may be associated with a more recent modification process or other operation. Therefore, the second precomputation process may be configured to modify dependent values based on more recent modifications to other values. The dependent values modified by the second precomputation process would replace those modified by the first precomputation process, causing the first precomputation process in the queue to be redundant.

In some implementations, responsive to one or more of a determination that the first value has been modified or receipt of confirmation data indicating a modification of the first value, a backfill process may be generated and enqueued for access to the CRSM. The backfill process may be configured to recalculate one or more values in the CRSM based on the modification to the first value. For example, the first value may include a source value, such as business logic or another type of data upon which a large number of values within a database may depend. Continuing the example, the first value may include a fraud status associated with a vender. Modification of the fraud status associated with the vender may require recalculation of every item in a database associated with that vender. In some implementations, a backfill process may recalculate all or a portion of the values in a database, based at least in part on a modified source value, without independently determining the dependency of one or more of the values in the database. For example, the backfill process may access and recalculate each value in a database based on the current status of the values from which the recalculated values depend. To facilitate modification of a large number of values, a backfill process may be separated into a plurality of modification processes, one or more of which may be separately enqueued for access to one or more databases.

In some implementations, enqueuing a backfill process may include generating queue data in a separate queue from which other processes, such as modification or precomputation processes, are enqueued. One or more priority rules may be accessed to determine a priority corresponding to one or more of the backfill queue or the queue containing other processes. For example, a priority rule may include certain days and times, such as times historically associated with low use of a database by other processes, during which backfill processes enqueued on a backfill queue will be granted access to values prior to other processes. During other days and times, other processes may be granted access to values prior to backfill processes.

In some implementations, another process, such as a precomputation process, may be enqueued and executed, after a backfill process is enqueued but prior to execution of the backfill process. For example, a backfill process configured to modify a particular value may be enqueued, but prior to modification of that value by the backfill process, a precomputation process may modify the particular value based on one or more recent modifications to other values in the database. The backfill process may have a version identifier associated therewith, and the precomputation process may assign a different version identifier to a modified value. Upon accessing the modified value, the backfill process may determine a lack of correspondence between the version identifier associated with the backfill process and that associated with the modified value. For example, the version identifier associated with the modified value may be identified as more recent than the version identifier associated with the backfill process. The backfill process may refrain from modifying values having a more recent version identifier stored in association therewith. This may avoid redundant operations in which the backfill process replaces a value that has been recently updated with an identical value.

In some implementations, to prevent simultaneous access to a particular value by multiple processes, processes may be enqueued to a database using a host device to which a lock has been granted. For example, multiple processes having the same value or output associated therewith may be assigned to a single partition of a database. Each partition of the database may have a lock associated therewith, and each lock may be assigned to a host device. A process may be provided to the host device associated with the partition assigned to the process for that process to be enqueued. The host device may provide confirmation data indicative of receipt of the process. If one or more host devices fail, become unavailable, or if the number of processes accessing a particular partition exceeds the computation capabilities of the host device to which the partition is assigned, the host device may be disassociated from one or more partitions. A workload associated with one or more additional host devices may be determined, and the partition(s) from which the host device was disassociated may be assigned to one or more of the additional host devices.

Implementations described herein may thereby facilitate maintenance of accurate values in one or more databases or other types of data stores by ensuring that multiple related processes are enqueued and executed. For example, a single process of a group of related processes may be prevented from being enqueued or from being executed prior to receiving confirmation data regarding enqueuing or execution of a related process. Implementations described herein may also use dynamically changeable host devices assigned to partitions of a database to control access to stored values.

FIG. 1 depicts a system 100 that may be used to receive, enqueue, and execute processes to modify one or more values within one or more databases 102. The one or more databases 102 may store a plurality of values 104. The depicted databases 102 may include any manner and any number of data stores, memories, or other computer-readable storage media (CRSM). For example, the databases 102 may include one or more electronic storage media, magnetic storage media, optical storage media, quantum storage media, mechanical computer storage media, and so forth. The databases 102 may include one or more database management systems (DBMS), such as MySQL, PostgreSQL, Microsoft SQL Server, Oracle, SAP, IBM DB2, DynamoDB, and so forth. The databases 102 may operate using one or more standards, such as Structured Query Language (SQL), Open Database Connectivity (ODBC), Java Database Connectivity (JDBC), and so forth.

FIG. 1 depicts four example values 104: a first value 104(1), a second value 104(2), a third value 104(3), and a fourth value 104(4). In the depicted implementation, the second value 104(2) and the third value 104(3) are dependent upon the first value 104(1). For example, the first value 104(1) may include a numerical value, represented as "A." The second value 104(2) may include the related value "A+1," and the third value 104(3) may include the related value "A*1.08". Continuing the example, the first value 104(1) may include a price associated with an item, while the second value 104(2) may include the price of the item plus a shipping cost, and third value 104(3) may include the price of the item including a sales tax. As such, if the first value 104(1) were modified due to a change in the price of the item, the second value 104(2) and the third value 104(3) would also be affected due to their dependency on the first value 104(1). The fourth value 104(4) may include a source value 104, applicable to numerous values 104 within the database(s) 102. For example, the fourth value 104(4) may include a tax rate upon which the second value 104(2) and other similar values 104 in the database(s) 102 may be based.

To reduce latency in a user experience associated with the purchase of the item, the second value 104(2) and the third value 104(3) may be precomputed using the first value 104(1) at or near the time that the first value 104(1) is modified. For example, FIG. 1 depicts one or more user devices 106 providing a modification process 108 configured to modify the first value 104(1) to one or more servers 110 or other types of computing devices in communication with the database(s) 102. The user device(s) 106 or server(s) 110 may include any type of computing device, such as mobile devices, smartphones, set-top boxes, tablet computers, personal computers, wearable computers, servers, or other types of computing devices.

A precomputation module 112 in the server(s) 110 may receive the modification process 108 and determine the value(s) 104 in the database(s) 102 associated with the modification process 108. For example, the depicted modification process 108 may attempt to replace the first value 104(1) (e.g., "A") with an updated or modified first value 104(1) (e.g., "B"). The precomputation module 112 may access database data 114 to determine one or more databases 102 that contain the first value 104(1) and the specific location(s) of the first value 104(1) in the database(s) 102. In some implementations, the database data 114 may include metadata or other types of data indicative of relationships between the first value 104(1) and one or more other values 104. For example, by accessing the database data 114, the precomputation module 112 may determine that the second value 104(2) and the third value 104(3) depend upon the first value 104(1). The precomputation module 112 may also determine the nature of the dependencies between the values 104 from the database data 114. In other implementations, the first value 104(1) may have metadata or other types of data associated therewith that indicate one or more precomputation processes 116 to be performed upon modification of the first value 104(1). In still other implementations, the modification process 108 may include one or more precomputation processes 116 to be performed in addition to the modification process 108. Based on one or more of first value 104(1), the modification process 108, or the database data 114, the precomputation module 112 may generate or access one or more precomputation processes 116. The precomputation process(es) 116 may be configured to modify the second value 104(2) and the third value 104(3) based on the modification to the first value 104(1) and the relationships between the values 104.

A queue module 118 may be configured to provide the precomputation process(es) 116 to the database(s) 102 and enqueue the precomputation process(es) 116 for access to the database(s) 102. For example, the queue module 118 may generate queue data 120 indicative of the precomputation process(es) 116 for storage in the database(s) 102. Continuing the example, the precomputation process(es) 116 may be provided to a host device (not shown) that has been granted a resource lock to access a partition of the database(s) 102 that contain one or more of the first value 104(1), the second value 104(2), or the third value 104(3). The host device may maintain and manage a queue associated with the database(s) 102 and may provide confirmation data 122 to the server(s) 110 indicating that the precomputation process(es) 116 have been enqueued for access to the database(s) 102. In other implementations, a separate device, service, or process may maintain the queue associated with the database(s) 102.

As described previously, in some implementations, the server(s) 110 may refrain from enqueuing the modification process 108 for access to the database(s) 102 until confirmation data 122 indicating successful enqueuing of the precomputation process(es) 116 has been received. Failure to enqueue a precomputation process 116 prior to enqueuing a modification process 108 may result in updating one value 104 without updating one or more values 104 that are dependent on the value 104, such that the dependent values 104 in the database 102 are inaccurate. For example, if the price of an item is updated using a modification process, but an associated precomputation process fails to update a dependent value corresponding to the price of the item, plus a shipping cost and a sales tax, the dependent value would be inaccurate. As such, enqueuing the modification process 108 after receipt of the confirmation data 122 indicating successful enqueuing of the precomputation process(es) 116 facilitates accuracy of the values 104 dependent upon the first value 104(1).

One or more of the queue module 118 or a modification module 124 may provide the modification process 108 to the data base(s) 102 and enqueue the modification process 108 for access thereto. The modification module 124 may determine execution of the modification process 108 and modification of the first value 104(1). In some implementations, additional confirmation data 122 may be received, indicating that the first value 104(1) has been modified. In other implementations, the modification process 108 may assign or update a version identifier associated with the first value 104(1). The precomputation process(es) 116 may also have a version identifier associated therewith. The version identifiers may be indicative of a time at which the precomputation process(es) 116 were generated or the first value 104(1) was modified.

In some implementations, the precomputation process(es) 116 may access the first value 104(1) to determine the version identifier associated therewith. If the version identifier associated with the first value 104(1) is less recent than the version identifier associated with the precomputation process(es) 116, this may indicate that the modification process 108 has not yet modified the first value 104(1). Responsive to this determination, the precomputation process(es) 116 may be deferred and retried or the precomputation process(es) 116 may fail. A deferred precomputation process 116 may determine the version identifier associated with the first value 104(1) at a later time. If the version identifier associated with the first value 104(1) is still less recent than that associated with the precomputation process(es), the modification process 108 may have failed. In the event of a failed modification process 108, the precomputation process(es) 116 may recalculate the second value 104(2) and the third value 104(3) using the unmodified first value 104(1). In some implementations, the precomputation process(es) 116 may be deferred for a length of time corresponding to an expected time for execution of the modification process 108, then retried. If the version identifier associated with the first value 104(1) is older than that associated with the precomputation process(es) 116 upon retrial of the precomputation process(es) 116, this may indicate that the modification process 108 has failed. Responsive to this determination, the precomputation process(es) 116 may fail, or the precomputation process(es) 116 may recalculate the second value 104(2) and the third value 104(3) using the unmodified first value 104(1). If the version identifier of the first value 104(1) is determined to be equal to or more recent than that associated with the precomputation process(es) 116, this may indicate that the modification process 108 or a subsequent process has modified the first value 104(1). Responsive to this determination, the precomputation process(es) 116 may be executed to modify the second value 104(2) and the third value 104(3) using the modified first value 104(1).

FIG. 1 also depicts a backfill module 126 associated with the server(s) 110. The backfill module 126 may generate, enqueue, or execute one or more backfill processes responsive to updating of a source value 104, such as business logic or another type of data upon which a large number of values 104 within the database(s) 102 may depend. For example, one or more user devices 106 may provide a modification process 108 configured to modify the fourth value 104(4). In the depicted example system 100, the fourth value 104(4) may represent a sales tax rate applicable to items, while the third value 104(3) represents a precalculated cost of an item, including a sales tax. Numerous values 104 in the database(s) 102 in addition to those depicted in FIG. 1 may be affected by a modification of the fourth value 104(4). As such, the fourth value 104(4) or the modification process 108 configured to modify the fourth value 104(4) may include a backfill process associated therewith. In other implementations, confirmation data 122 indicative of modification of the fourth value 104(4) may be received, and the backfill module 126 may generate a backfill process responsive to the confirmation data 122.

A backfill process may be configured to recalculate all or a portion of the values 104 in the database(s) 102 responsive to the modification of a source value 104, such as the fourth value 104(4), independent of relationships between values 104 indicated in the database data 114. In some implementations, a backfill process may be configured to determine version identifiers associated with one or more values 104 and to refrain from modifying values 104 having version identifiers more recent than that associated with the backfill process. In other implementations, other filters may be applied to the backfill process to include or exclude certain values 104 from modification. For example, a backfill process may refrain from modifying values 104 within selected databases 102, values 104 relating to certain types of data, and so forth.

Figure 2:
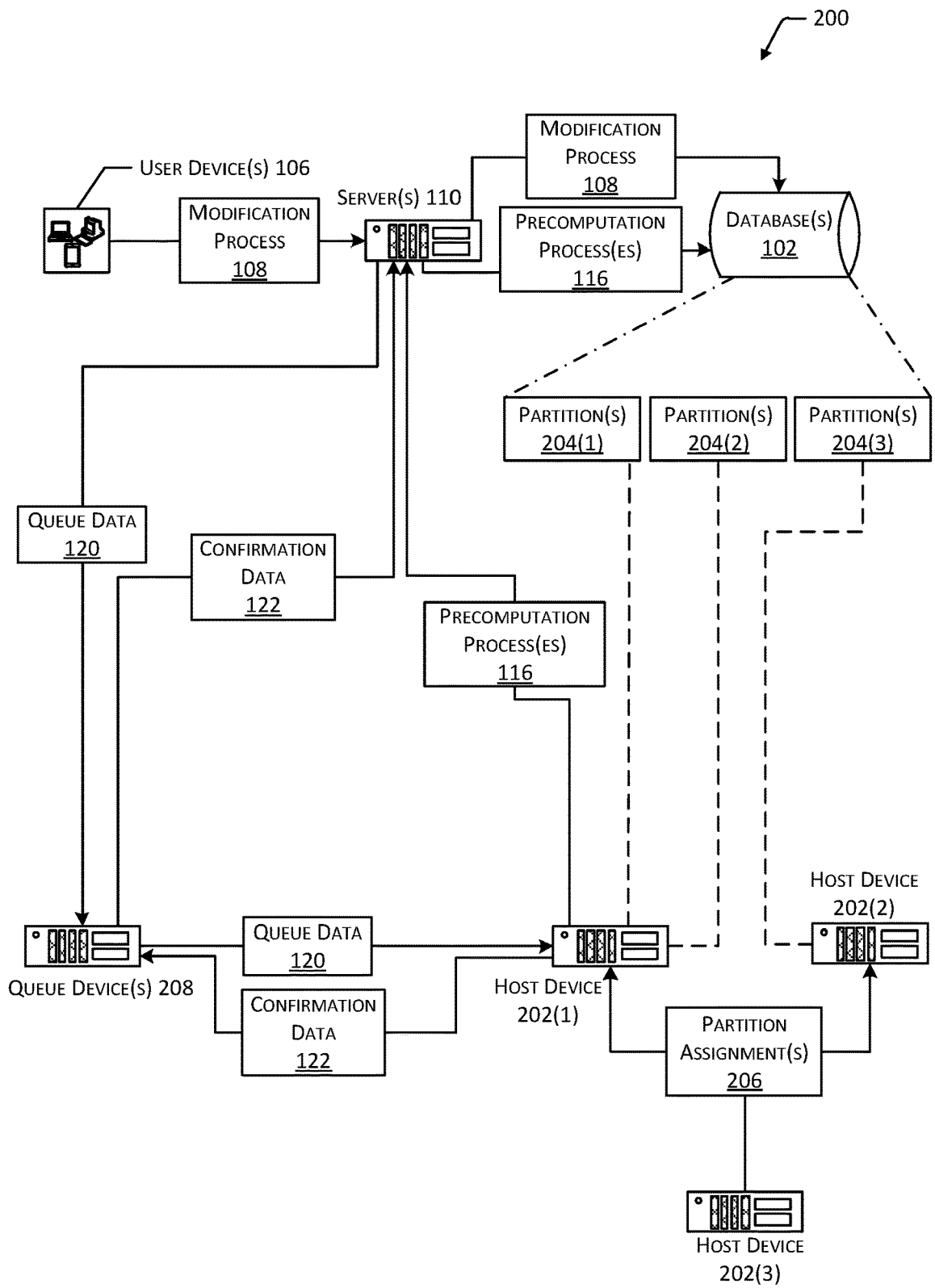
FIG. 2 depicts a system for enqueuing and executing precomputation processes using one or more host devices.

FIG. 2 depicts an example system 200 that may be used to generate, enqueue, and execute precomputation processes 116 using one or more host devices 202. In the depicted implementation, the database(s) 102 may be divided into partitions 204 based upon the values 104 or other outputs therein that may be modified via modification processes 108 or precomputation processes 116. Use of a single partition 204 assigned to a single value 104 or set of values 104 may enable a single lock to be assigned to the partition 204 to control access to the values 104 associated with the partition 204. As such, use of partitions 204 may reduce the time and computational resources associated with use of resource locks in a large-scale database system by effectively converting the large scale database system into multiple smaller systems. Specifically, FIG. 2 depicts three example sets of partitions 204 associated with the database(s) 102: a first set of partitions 204(1), a second set of partitions 204(2), and a third set of partitions 204(3). Each set of partitions 204 may include one or multiple partitions 204.

A first host device 202(1) is shown having the first set of partitions 204(1) and the second set of partitions 204(2) assigned thereto. A second host device 202(2) is shown having the third set of partitions 204(3) assigned thereto. A third host device 202(3) may control the assignment of partitions 204 to host devices 202. For example, the third host device 202(3) is depicted providing partition assignments 206 to the first host device 202(1) and the second host device 202(2). In some implementations, the third host device 202(3) may monitor one or more of the other host devices 202 or the number of processes accessing one or more of the partitions 204. The third host device 202(3) may further provide or modify partition assignments 206 responsive to changes in the host devices 202 or partitions 204. For example, if the first host device 202(1) or second host device 202(2) fails or becomes disassociated from a partition 204, the third host device 202(3) may reassign one or more partitions 204 previously assigned to the first host device 202(1) or second host device 202(2) to other host devices 202. If a number of processes accessing one or more partitions 204 increases such that the computation capacity of a host device 202 is exceeded by the processes accessing partitions 204 assigned thereto, the third host device 202(3) may reassign one or more of the partitions 204 assigned to that host device 202 to other host devices 202. In some implementations, the first host device 202(1), the second host device 202(2), or one or more other host devices 202 may monitor the third host device 202(3). In the event that the third host device 202(3) fails, a different host device 202 may begin monitoring other host devices 202 and providing partition assignments 206 thereto. The ability to access and modify partition assignments 206 may be restricted using a resource lock, such that a single host device 202 may access and modify partition assignments 206 at a given time.

One or more user devices 106 are shown providing a modification process 108 to one or more servers 110. The server(s) 110 may function as a router, which may be used to provide processes to the database(s) 102. The server(s) 110 may further provide and receive processes and other data to and from the host devices 202 or one or more intermediate devices. For example, responsive to receipt of the modification process 108 from the user device(s) 106, the server(s) 110 may provide queue data 120 indicative of the modification process 108 to one or more queue devices 208. The user devices 106, servers 110, host devices 202, or queue devices 208 may include any type of computing devices, such as mobile devices, smartphones, set-top boxes, tablet computers, personal computers, wearable computers, servers, or other types of computing devices. The queue data 120 may include one or more identifiers, metadata, or other types of data associated with the modification process 108. In some implementations, the modification process 108, itself, may be provided to the queue device(s) 208, in lieu of queue data 120, to be enqueued for access to the database(s) 102.

The queue device(s) 208 may in turn provide the queue data 120 or the modification process 108 to the host device 202 associated with the partition 204 containing the value(s) 104 associated with the modification process 108. For example, FIG. 2 depicts the queue device(s) 208 providing the queue data 120 to the first host device 202(1). In other implementations, a queue may be maintained by or associated with the host device(s) 202 or the server(s) 110, rather than one or more separate queue device(s) 208, thus eliminating use of the queue device(s) 208. In some implementations, the first host device 202(1) may generate one or more precomputation process(es) 116 based on the queue data 120 or the modification process 108. In other implementations, the modification process 108, the queue data 120, or the value(s) 104 associated with the modification process 108 may include one or more precomputation processes 116 associated therewith. When the first host device 202(1) determines that access to the database(s) 102 for one or more of the modification process 108 or the precomputation process(es) 116 is available, the first host device 202(1) may provide the precomputation process(es) 116 to the server(s) 110 for provision to the database(s) 102.

When the precomputation process(es) 116 have been enqueued for access to the database(s) 102, prior to enqueuing of the modification process 108 to prevent inaccuracies in the database(s) 102, one or more of the first host device 202(1) or the queue device(s) 208 may provide confirmation data 122 to the server(s) 110. Responsive to the confirmation data 122, the server(s) 110 may provide the modification process 108 to the database(s) 102 to update one or more values 104 stored therein. The precomputation process(es) 116 may subsequently be executed to update dependent values stored in the database(s) 102. In some implementations, the first host device 202(1) may provide confirmation data 122 to the queue device(s) 208 to indicate that the precomputation process(es) 116 have been provided to the server(s) 110.

Figure 3:
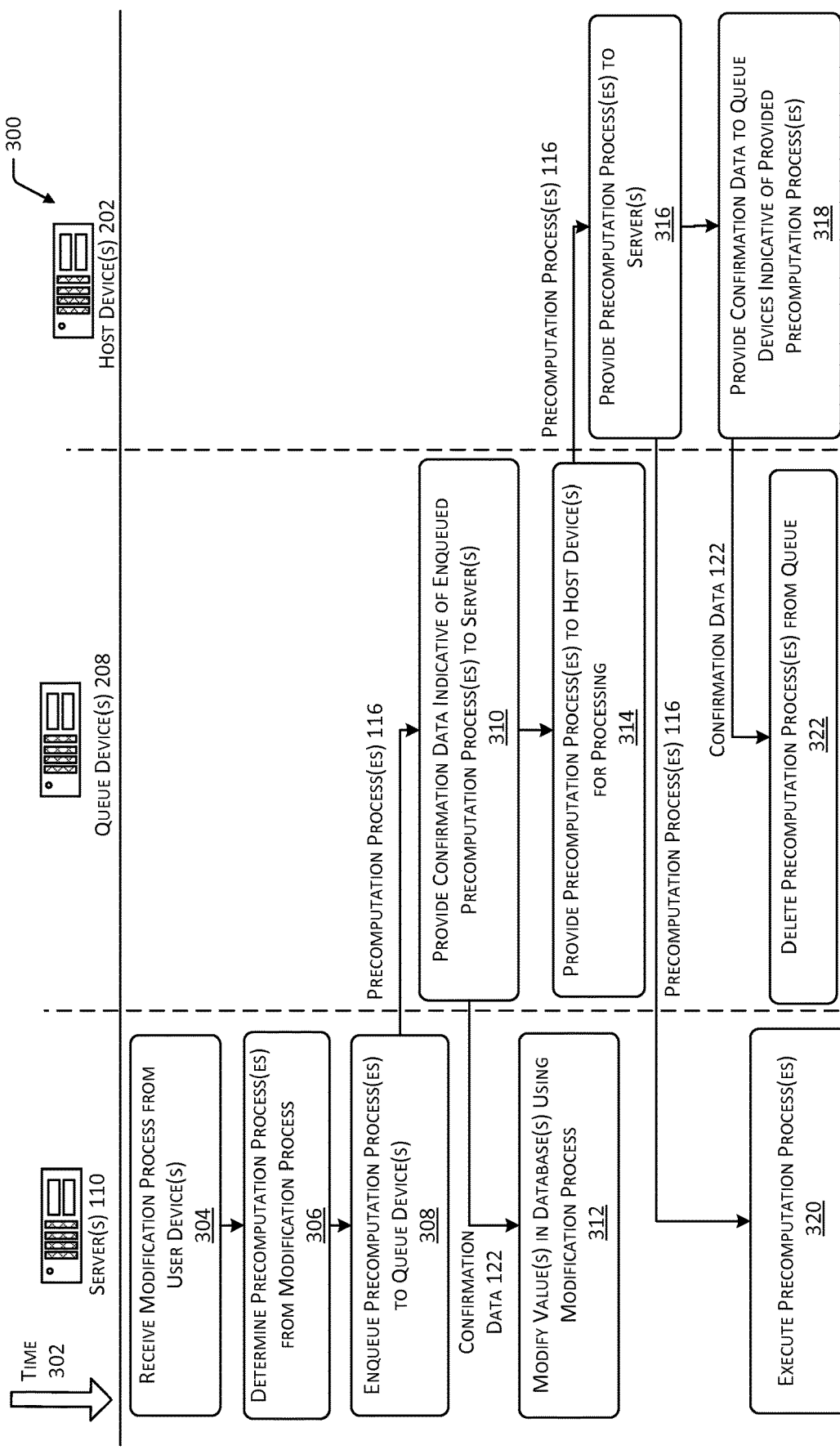
FIG. 3 illustrates one possible implementation of the flow of data between one or more servers, queue devices, and host devices.

FIG. 3 illustrates a flow diagram of one possible implementation 300 of a flow of data between one or more servers 110, queue devices 208, and host devices 202. The progression of time 302 is illustrated along the vertical axis, with time increasing toward the downward direction.

Block 304 illustrates receipt, by the server(s) 110, of a modification process 108 from one or more user devices 106. One or more modification processes 108 may be received from the user devices 106, from other sources, or accessed from a data store associated with the server(s) 110. In other implementations, the server(s) 110 may be used to generate a modification process 108. The modification process 108 may be configured to modify one or more values 104 stored within one or more databases 102.

Block 306 illustrates determination, by the server(s) 110, of one or more precomputation processes 116 from the modification process 108. In some implementations, the server(s) 110 may generate one or more precomputation processes 116. For example, the precomputation module 112 may be used to determine one or more additional values 104 that depend upon the value 104 to be modified by the modification process 108. In other implementations, the modification process 108 may include a precomputation process 116 associated therewith. In still other implementations, the value(s) 104 modified by the modification process 108 may include one or more precomputation processes 116 associated therewith.

Block 308 illustrates the server(s) 110 enqueuing the precomputation process(es) 116 to one or more queue devices 208. In some implementations, queue data 120 indicative of the precomputation process(es) 116 may be provided to the queue device(s) 208 for entry on a queue for access to the database(s) 102. In other implementations, the precomputation process(es) 116 themselves may be provided to the queue device(s) 208. In still other implementations, the queue may be associated with the host device(s) 202 or the server(s) 110, rather than one or more separate queue device(s) 208, thus eliminating use of the queue device(s) 208.

Block 310 illustrates providing, by the queue device(s) 208, of confirmation data 122 to the server(s) 110. The confirmation data 122 may indicate the enqueuing of the precomputation process(es) 116 for access to the database(s) 102. Once the precomputation process(es) 116 have been durably enqueued for access to the database(s) 102, the confirmation data 122 may be used to determine that the enqueuing of the precomputation process(es) 116 has not failed. As such, the value(s) 104 associated with the modification process 108 may be modified due to the fact that the enqueued precomputation process(es) 116 will subsequently update values 104 dependent from the value(s) 104 associated with the modification process 108.

Block 312 illustrates modification of the value(s) 104 in the database(s) 102 using the modification process 108. For example, after receipt of the confirmation data 122 indicating enqueuing of the precomputation process(es) 116, the server(s) 110 may enqueue the modification process 108 for access to the database(s) 102 and execute the modification process 108. One or more of the queue module 118 or the modification module 124 may be used to enqueue and subsequently execute the modification process 108. In some implementations, modification of the value(s) 104 associated with the modification process 108 may include assigning, modifying, or updating a version identifier associated with the value(s) 104.

Block 314 illustrates providing of the precomputation process(es) 116, by the queue device(s) 208, to the host device(s) 202 for processing. For example, the host device 202 assigned to the partition 204 associated with the values 104 to be modified by the precomputation process(es) 116 may index or otherwise process the precomputation process(es) 116 to facilitate execution thereof.

Block 316 illustrates providing of the precomputation process(es) 116, by the host device(s) 202, to the server(s) 110 for execution in the database(s) 102. In some implementations, the host device(s) 202 may index the precomputation process(es) 116, determine a data path associated therewith, and so forth.

Block 318 illustrates providing, from the host device(s) 202 to the queue device(s) 208, confirmation data 122 indicative of the precomputation process(es) 116 provided to the server(s) 110. Responsive to receipt of the precomputation process(es) 116 by the server(s) 110, block 320 illustrates the server(s) 110 executing the precomputation process(es) 116. Responsive to receipt of the confirmation data 122 from the host device(s) 202, block 322 illustrates the queue device(s) 208 deleting the precomputation process(es) 116, or queue data 120 indicative thereof, from a queue.

In some implementations, execution of the precomputation process(es) 116 by the server(s) 110 may include accessing the value(s) 104 modified by the modification process 108 to determine whether the modification process 108 has successfully updated the value (s) 104. For example, the modification process 108 may assign, modify, or update a version identifier associated with the modified value(s) 104. When a precomputation process 116 determines that the version identifier associated with a value 104 to be equal to or more recent than a version identifier associated with the precomputation process 116, the precomputation process 116 may recalculate one or more dependent values 104 based on the modified value 104. If the precomputation process 116 determines that the version identifier associated with a value 104 is less recent than the version identifier associated with the precomputation process 116, this determination may indicate that the modification process 108 has not yet updated the value 104. A failure to update the value 104 may occur if the modification process 108 fails, if enqueuing of the modification process 108 fails, or if the modification process 108 has been enqueued but has not yet been executed. In some implementations, responsive to a determination that the value 104 has not been updated, the precomputation process 116 may be deferred, such as by enqueuing the precomputation process 116 on a queue for containing deferred processes. For example, execution of the precomputation process 116 may be delayed for a length of time corresponding to an expected time by which, absent a failure of the modification process 108, the modification process 108 will have modified an associated value 104. Subsequent to the length of time, the precomputation process 116 may access the value 104 to determine the version identifier associated therewith. If the precomputation process 116 determines that the version identifier associated with a value 104 is less recent than the version identifier associated with the precomputation process 116, the precomputation process 116 may fail. In some implementations, the precomputation process 116 may be executed using the unmodified value 104 to recalculate the dependent values 104. For example, if a modification process 108 configured to replace a first value 104 "A" with a value 104 "B" fails, the precomputation process 116 may recalculate one or more values 104 dependent from the first value 104 using a status of "A" for the first value 104.

In some implementations, if successful execution of the precomputation process 116 is not determined, the precomputation process 116 may be retried. For example, confirmation data 122 indicative of successful execution of the precomputation process 116 may be received prior to removal of the precomputation process 116 from the queue. Until successful execution of the precomputation process 116 is determined, the precomputation process 116 may be retried indefinitely to avoid inaccuracy in the database(s) 102 that may be otherwise introduced (e.g., if the modification process 108 is executed while the precomputation process 116 fails to update dependent values 104).

Figure 4:
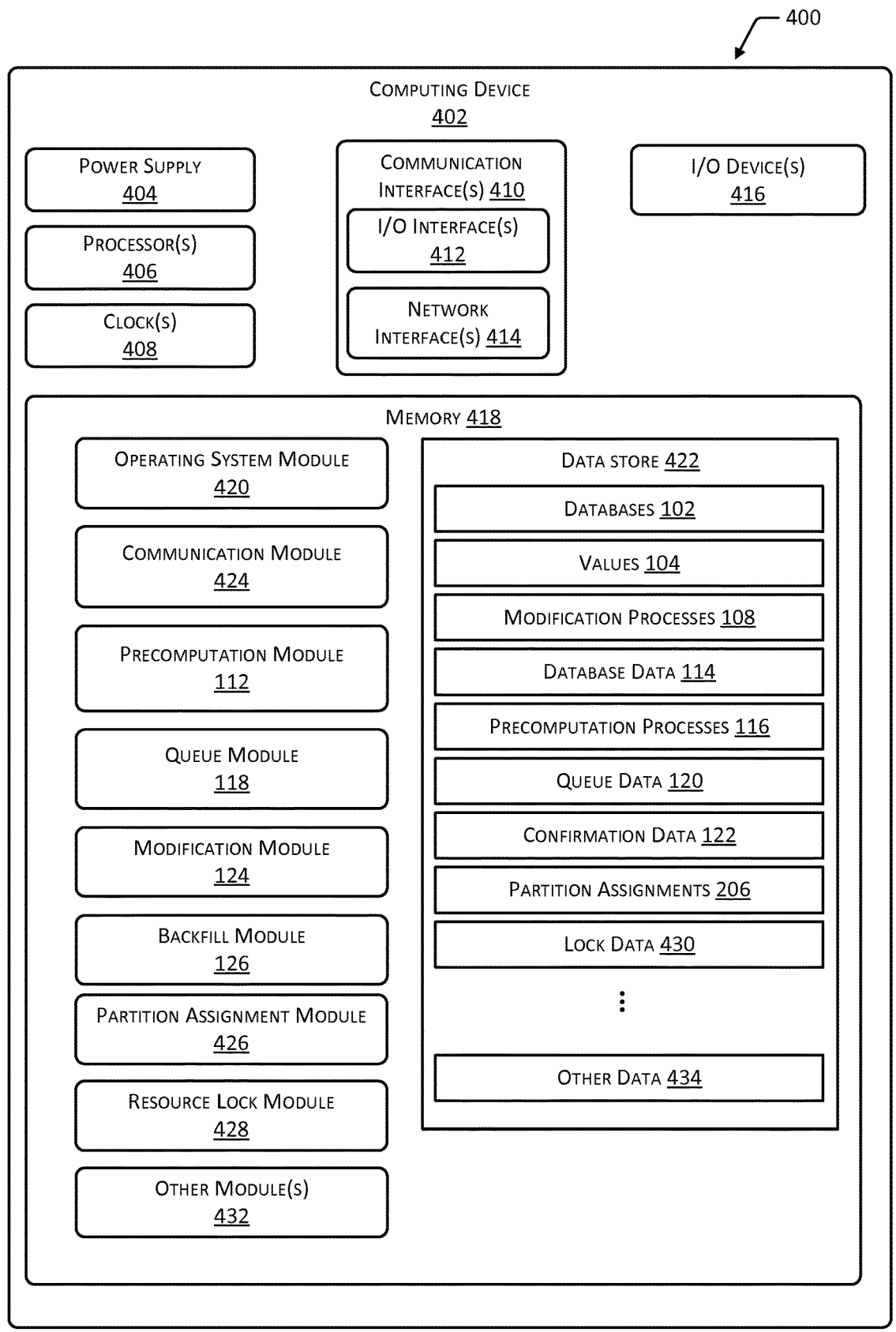
FIG. 4 is a block diagram illustrating a computing device within the scope of the present disclosure.

FIG. 4 is a block diagram 400 of a computing device 402 configured to support operation of the system 100. The computing device 402 may include one or more devices storing or in communication with the databases 102, one or more servers 110, one or more user devices 106, one or more queue devices 208, one or more host devices 202, other computing devices 402, or computer readable storage media (CRSM) accessible to any of the computing devices 402.

One or more power supplies 404 may be configured to provide electrical power suitable for operating the components in the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clocks 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components thereof, to communicate with other devices or components. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input device or output device associated with a database 102, a user device 106, a server 110, a queue device 208, a host device 202, or another computing device 402. For example, I/O devices 416 may include touch sensors, buttons, keyboards, mouse devices, cameras, microphones, scanners, displays, speakers, haptic devices, printers, and so forth. In some implementations, the I/O devices 416 may be physically incorporated with the computing device 402 or may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs, wide area networks (WANs), wireless WANs, and so forth. For example, the network interfaces 414 may include devices compatible with Ethernet, Wi-Fi, Bluetooth, ZigBee, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer readable storage media (CRSM). As described previously, the CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

A data store 422 and one or more of the following modules may also be stored in the memory 418. The modules may be executed as foreground applications, background tasks, daemons, and so forth. The data store 422 may use a flat file, database, linked list, tree, executable code, script, or other data structure to store information. In some implementations, the data store 422 or a portion of the data store 422 may be distributed across one or more other devices including the computing devices 402, network attached storage devices, and so forth.

A communication module 424 may be configured to establish communications with one or more other computing devices 402, such as user devices 106, devices storing or managing the databases 102, servers 110, queue devices 208, host devices 202, remote CRSM, and so forth. The communications may be authenticated, encrypted, and so forth.

The memory 418 may also store the precomputation module 112. The precomputation module 112 may be configured to determine one or more precomputation processes 116 associated with a modification process 108. For example, the precomputation module 112 may determine a value 104 associated with a modification process 108. The precomputation module 112 may further access database data 114 to determine one or more other values 104 dependent upon that value 104 and the relationship between the dependent value(s) 104 and the value 104 to be modified by the modification process 104. Using the modification process 108 and the database data 114, the precomputation module 112 may generate one or more precomputation processes 116 associated with the modification process 108. In other implementations, the modification process 108 may include data indicative of one or more precomputation processes 116 associated therewith. The precomputation module 112 may access this data to determine the precomputation process(es) 116. In still other implementations, one or more values 104 to be modified by the modification process 108 may include data indicative of one or more precomputation processes 116 associated therewith. For example, the values 104 may be configured to cause initiation of a precomputation process 116 upon modification thereof.

The memory 418 may also store the queue module 118. The queue module 118 may be configured to enqueue precomputation processes 116 for access to databases 102. For example, the queue module 118 may provide queue data 120 indicative of precomputation processes 116 to queue devices 208, host devices 202, servers 110, or computing devices 402 associated with the databases 102. In some implementations, the queue module 118 may provide the precomputation processes 116 to one or more computing devices 402 for enqueuing. In other implementations, the queue module 118 may maintain a queue of processes, such as precomputation or modification processes, for access to the databases 102, provide confirmation data 122 to computing devices 402 indicative of successful enqueuing of processes, provide notifications to computing devices 402 indicative of executed or failed processes, and so forth.

The memory 418 may further store the modification module 124. The modification module 124 may provide modification processes 108 or precomputation processes 116 to the databases 102, determine execution of the modification processes 108 or precomputation processes 116, modify values 104 in the databases 102, modify version identifiers associated with the values 104, and so forth. For example, responsive to receipt of confirmation data 122 indicating enqueuing of one or more precomputation processes 116, the modification module 124 may provide a modification process 108 to one or more databases 102, determine execution of the modification process 108 to modify one or more values 104, and update the version identifiers associated with the modified values 104. Subsequent execution of the precomputation process(es) 116 may include determination of the updated version identifiers prior to the precomputation process(es) 116 modifying values 104 dependent upon the values 104 modified by the modification process 108.

The memory 418 is further depicted storing the backfill module 126. The backfill module 126 may be used to generate, enqueue, or execute backfill processes to recalculate one or more values 104 in the databases 102, subsequent to the modification of one or more other values 104 by modification processes 108 or precomputation processes 116. For example, a modification process 108 may update a source value 104, such as business logic or another type of data, the modification of which may affect a large number of values 104 within the database(s) 102. In some implementations, one or more values 104 may include data indicative of a backfill process associated therewith, such that modification of the value(s) 104 results in the initiation of a backfill process by the backfill module 126. In other implementations, a backfill process may be manually initiated, such as by a user device 106. In still other implementations, a modification process 108 or precomputation process 116 may include data indicative of a backfill process associated therewith, such that execution of the modification process 108 or precomputation process 116 results in the initiation of a backfill process by the backfill module 126. A backfill process may be configured to recalculate all or a portion of the values 104 in the database(s) 102 responsive to the modification of a source value 104, independent of relationships between values 104 indicated in the database data 114. In some implementations, the backfill module 126 may be configured to determine version identifiers associated with one or more values 104 and to refrain from modifying values 104 having version identifiers more recent than that associated with the backfill process. In other implementations, the backfill module 126 may be configured to apply other filters to the backfill process to include or exclude certain values 104 from modification. For example, a backfill process may refrain from modifying values 104 within selected databases 102, values 104 relating to certain types of data, and so forth.

The memory 418 may store a partition assignment module 426. The partition assignment module 426 may determine and modify partition assignments 206 associated with one or more host devices 202. For example, the partition assignment module 426 may determine a host device 202 that may be used to monitor and provide partition assignments 206 to other host devices 202. The partition assignment module 426 may be configured to monitor the status of host devices 202 to which partitions 204 have been assigned to determine failure or disassociation of one or more host devices 202 from one or more partitions 204. Partitions 204 that have become disassociated from a host device 202 may be reassigned to other host devices 202 by the partition assignment module 426. In some implementations, the partition assignment module 426 may monitor the number of processes accessing a partition 204 and the computation capacity associated therewith. If the computation capacity of one or more partitions 204 nears or exceeds the computation capacity of a host device 202 associated with the one or more partitions 204, the partition assignment module 426 may reassign one or more partitions 204 from the host device 202 to other host devices 202. The partition assignment module 426 may also be configured to determine one or more processes that were enqueued to a partition 204 that is not associated with the values 104 to which the process(es) pertain. Upon a determination that a process is enqueued to an incorrect partition 204, the partition assignment module 426 may determine the correct partition 204 that is associated with the values 104 that pertain to the process and enqueue the process for access to the correct partition 204.

The memory 418 may further store a resource lock module 428. One or more of the values 104 and one or more of the partitions 204 may have locks associated therewith, to prevent simultaneous access to a value 104 or partition 204 by multiple processes. For example, the resource lock module 428 may ensure that a value 104 may not be accessed by multiple precomputation processes 116 simultaneously to avoid inaccuracies that may be introduced by concurrent operations. In some implementations, a host device 202 may be granted a lock to a partition 204, and modification processes 108 or precomputation processes 116 attempting to access values 104 associated with that partition 204 may be provided to the host device 202. In other implementations, the ability to monitor and modify partition assignments 206 associated with the host devices 202 may be restricted to a single host device 202 by granting a lock thereto. The resource lock module 428 may assign locks to processes and host devices 202, revoke locks when processes or devices fail, and maintain a queue of processes or devices attempting to access locks. Lock data 430 indicative of processes (e.g., modification processes 108 or precomputation processes 116) and devices to which locks have been granted, and indicative of processes and devices enqueued to receive locks, may be stored in the memory 418.

Other modules 432 may also be present in the memory 418. For example, encryption modules may be used to encrypt and decrypt communications between computing devices 402. Output generation modules may be used to provide results of modification processes 108 or precomputation processes 116 to user devices 106. User interface modules may receive modifications to the databases 102, values 104, and so forth, from one or more user devices 106 or other types of computing devices 402. Other data 434 may include priority data, rules regarding constraints for access to certain databases 102 or certain values 104, constraints regarding values 104 that may be modified by modification processes 108 and precomputation processes 116, and so forth. Priority data may be used to determine an order in which access may be granted to one or more processes or computing devices 402.

In different implementations, different computing devices 402 may have different capabilities or capacities. For example, the server(s) 110 may have significantly more processor 406 capability and memory 418 capacity compared to other computing devices 402, such as devices associated with the databases 102, user devices 106, and so forth.

Figure 5:
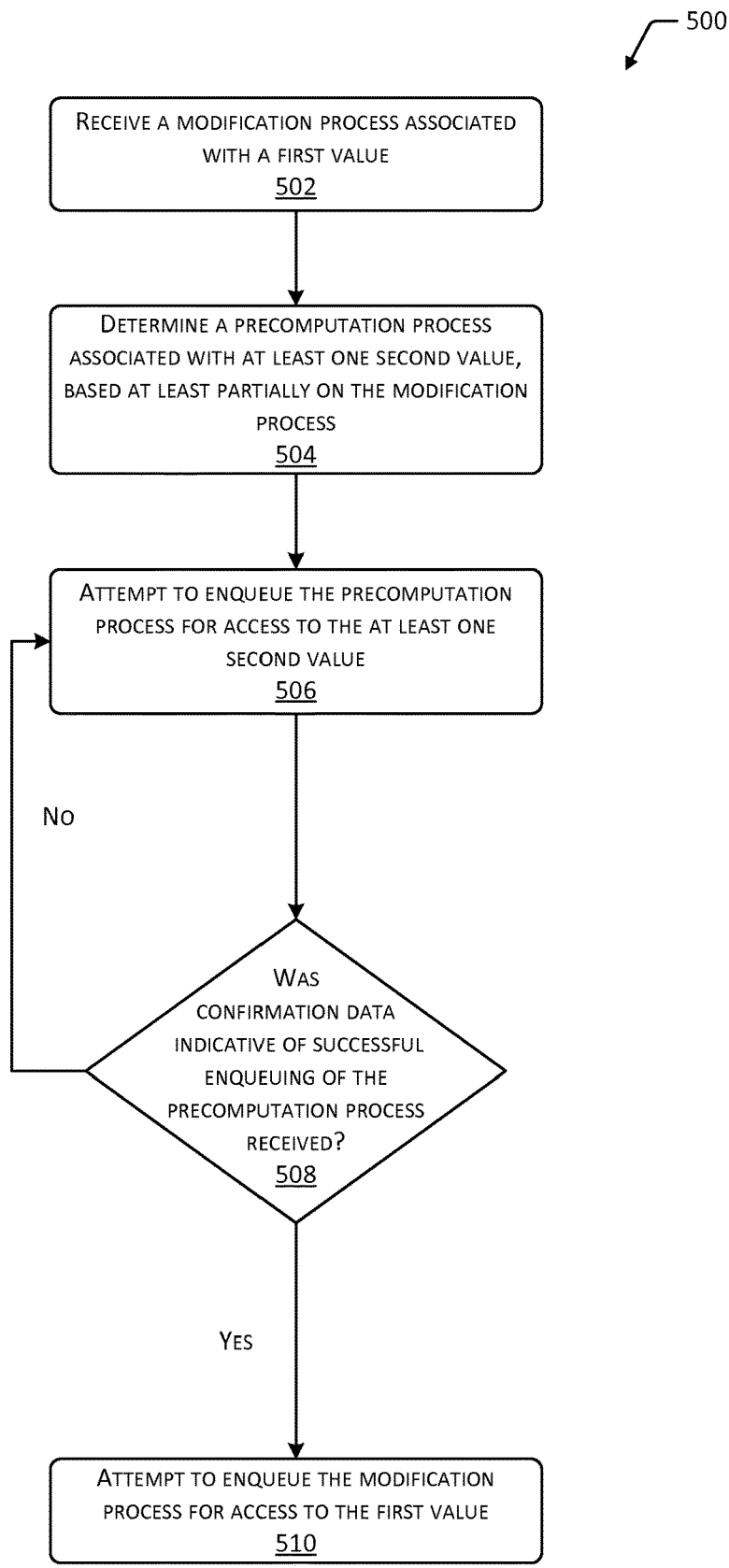
FIG. 5 is a flow diagram illustrating a method for confirming enqueuing of a precomputation process prior to enqueuing a modification process to prevent inaccuracy in values dependent on the value associated with the modification process.

FIG. 5 is a flow diagram 500 illustrating a method for confirming enqueuing of a precomputation process 116 prior to enqueuing a modification process 108 to prevent inaccuracy in values 104 dependent on the value 104 associated with the modification process 108. Attempts to enqueue a process for access to one or more databases 102 may fail. In some implementations, if a modification process 108 is enqueued prior to a precomputation process 116, and the enqueuing of the precomputation process 116 fails, the modification process 108 may modify a first value 104. However, due to the failure to enqueue the precomputation process 116, one or more values 104 dependent on the first value 104 may not be modified. Conversely, if the precomputation process 116 is enqueued prior to the modification process 108, and the enqueuing of the modification process 108 fails, the precomputation process 116 may calculate dependent values 104 based on the unmodified first value 104. As such, the values 104 in the databases 102 would not become inaccurate, and the modification process 108 may be subsequently retried. Therefore, enqueuing of the precomputation process 116 prior to enqueuing of an associated modification process 108 may facilitate maintenance of accurate values 104 within the databases 102.

Block 502 receives a modification process 108 associated with a first value 104(1). For example, one or more user devices 106 or other types of computing devices 402 may provide a modification process 108 to one or more servers 110 in communication with one or more databases 102. The modification process 108 may be configured to add a value 104 to the database(s) 102, delete a value 104 from the database(s) 102, replace or modify a value 104, merge multiple values 104 into a single value 104, divide a single value 104 into multiple values 104, and so forth. Values 104 within the database(s) 102 may include any manner of data, including tables, resources, textual data, audio data, video data, image data, and so forth. In some implementations, a modification process 108 may be accessed by one or more servers 110 for enqueuing and subsequent execution. For example, a modification process 108 may be stored in the server(s) 110 or a CRSM in communication therewith, and the server(s) 110 may be configured to access and initiate the modification process 108, periodically or at a single time.

Block 504 determines a precomputation process 116 associated with at least one second value 104(2), based at least partially on the modification process 108 associated with the first value 104(1). For example, a relationship between the first value 104(1) and one or more second values 104(2) that depend upon the first value 104(1) may be determined using database data 114. A precomputation module 112 may generate a precomputation process 116 based on the modification process 108, the first value 104, the one or more second values 104, the relationships between the values 104, and so forth. In some implementations, a precomputation process 116 may be accessed by one or more servers 110 for enqueuing and subsequent execution. For example, a value 104 may have data indicative of a precomputation process 116 associated therewith, such that modification of the value 104 results in initiation of the precomputation process 116. A modification process 108 may also have data indicative of a precomputation process 116 associated therewith, such that the precomputation process 116 may be determined from the received or accessed modification process 108.

Block 506 attempts to enqueue the precomputation process 116 for access to the at least one second value 104. The precomputation process 116, or queue data 120 indicative thereof, may be provided to a queue device 208, a host device 202, or another computing device 402 associated with the database(s) 102. When the precomputation process 116 has been successfully enqueued for access to the database(s) 102, confirmation data 122 indicative of the enqueuing of the precomputation process 116 may be generated, e.g., by the precomputation module 112.

Block 508 determines whether confirmation data 122 indicative of successful enqueuing of the precomputation process 116 was received, e.g., by the server(s) 110. If the confirmation data 122 was not received, the modification process 108 may not be enqueued. Instead, block 506 may be repeated, and enqueuing of the precomputation process 116 may be attempted again. In other implementations, both the precomputation process 116 and the associated modification process 108 may fail, until a subsequent modification process 108 is received.

If the confirmation data 122 indicative of successful enqueuing of the precomputation process 116 is received, block 510 attempts to enqueue the modification process 108 for access to the first value 104. The enqueued modification process 108 may subsequently be executed to modify the first value 104. The enqueued precomputation process 116 may be executed subsequent to execution of the modification process 108 to modify the at least one second value 104 based on the modified first value 104. If successful execution of the precomputation process 116 is not confirmed, the precomputation process 116 may be retried until it has been successfully executed to modify the at least one second value 104.

Figure 6:
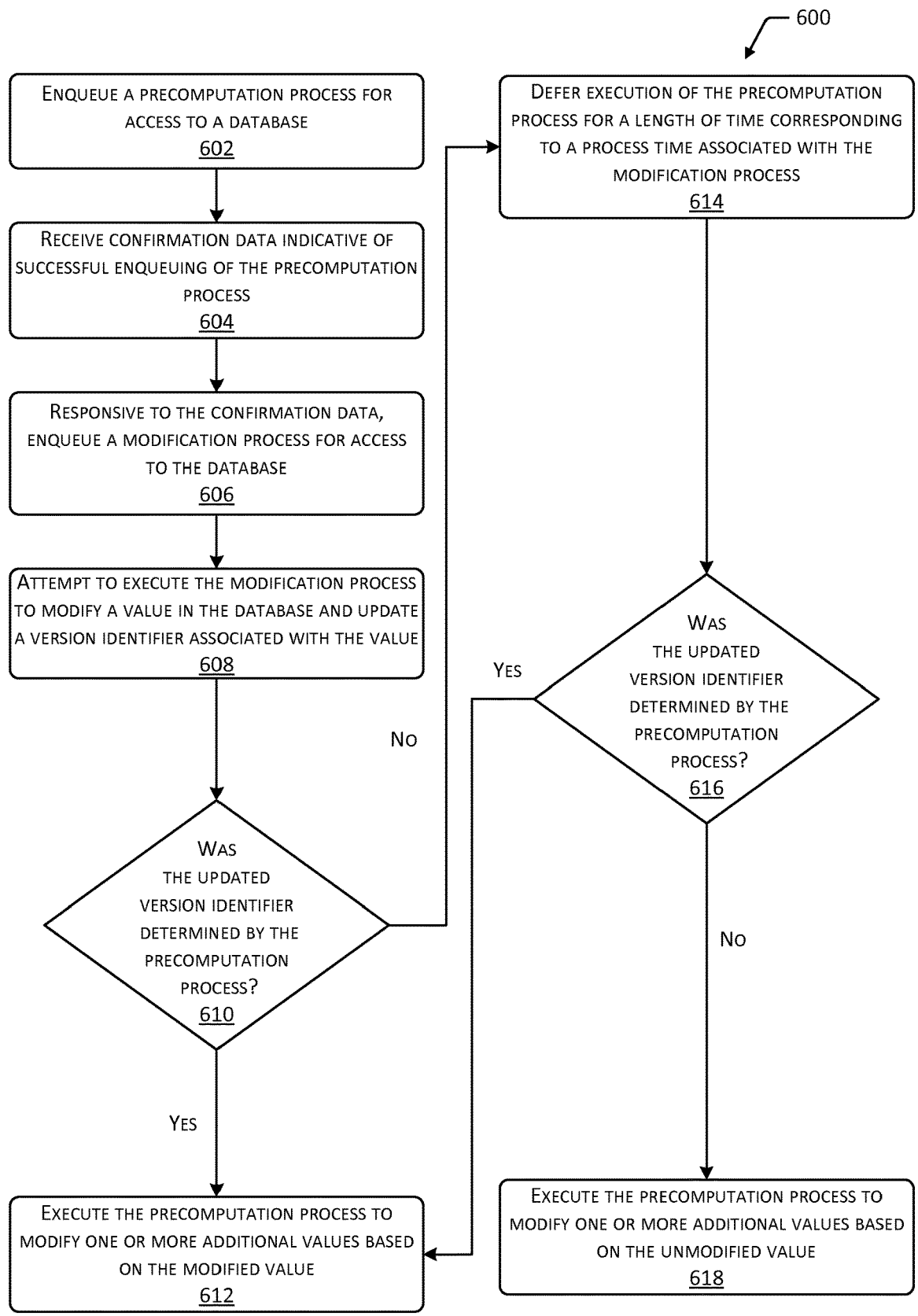
FIG. 6 is a flow diagram illustrating a method for confirming execution of a modification process prior to executing a precomputation process to prevent inaccuracy in values dependent on the value associated with the modification process.

FIG. 6 is a flow diagram 600 illustrating a method for confirming execution of a modification process 108 prior to executing a precomputation process 116 to prevent inaccuracy in values 104 dependent on the value 104 associated with the modification process. For example, attempts to enqueue a modification process 108 for access to one or more databases 102 may fail or the execution of the modification process 108 may fail or be delayed. If the precomputation process 116 is executed prior to execution of the modification process 108, the precomputation process 116 may calculate one or more dependent values 104 based on an unmodified value 104. If the modification process 108 then subsequently modifies the unmodified value 104, the values 104 in the database 102 may become inaccurate. As such, if it is determined that a modification process 108 has not been executed, execution of an associated precomputation process 116 may be delayed for a length of time sufficient to ensure that the modification process 108 has been executed or has failed. Therefore, execution of the modification process 108 prior to execution of an associated precomputation process 116 may facilitate maintenance of accurate values 104 within the databases 102.

Block 602 enqueues a precomputation process 116 for access to a database 102. As described previously, a precomputation module 112 may generate or access a precomputation process 116 and provide the precomputation process 116, or queue data 120 indicative thereof, to a queue device 208, host device 202, or other computing device 402 associated with the database 102. The precomputation process 116 may be configured to modify one or more values 104 in the database 102 based at least partially on a modified value 104 associated with a modification process 108.

Block 604 receives confirmation data 122 indicative of successful enqueuing of the precomputation process 116. Receipt of the confirmation data 122 may indicate that the enqueuing of the precomputation process 116 has not failed and that the precomputation process 116 will occur in the future, depending on the wait time associated with the queue.

Block 606 enqueues a modification process 108 for access to the database 102 responsive to receipt of the confirmation data 122. As described previously, confirmation of successful enqueuing of the precomputation process 116 prior to enqueuing the modification process 108 may prevent creation of inaccurate values 104 in the database 102. For example, if the enqueuing of the precomputation process 116 fails and the modification process 108 is executed, values 104 dependent upon the modified value 104 will not be updated based on the modification.

Block 608 attempts to execute the modification process 108 to modify a value 104 in the database 102 and update a version identifier associated with the value 104. Once an enqueued modification process 108 is executed and granted access to the database 102, such as through use of a resource lock, the modification process 108 may access and act upon a value 104. For example, the modification process 108 may add a value 104 to a database 102, remove a value 104, set a value 104 to null, modify or replace the value 104, merge multiple values 104 into a single value 104, separate a single value 104 into multiple values 104, and so forth. In some implementations, the value 104 may have a version identifier associated therewith, and the modification process 108 may access the version identifier. If the version identifier associated with the value 104 is more recent than a version identifier associated with the modification process 108, this determination may indicate that a more recent process acted upon the value 104 during the time that the modification process 108 was generated, enqueued, or executed. Responsive to this determination, the modification process 108 may refrain from acting upon the value 104. If the version identifier associated with the value 104 is equal to or less recent than that associated with the modification process 108, or if the value 104 lacks a version identifier, the modification process 108 may act upon the value 104. In addition to modifying the value 104, the modification process 108 may update the version identifier associated with the value 104. The updated version identifier may indicate that the modification process 108 has modified the value 104.

Block 610 determines whether the precomputation process 116 determined the updated version identifier associated with the value 104. When the precomputation process 116 is granted access to the database 102, it may access the value 104 that was to be modified by the modification process 108 to determine the version identifier associated therewith. In some implementations, the precomputation process 116 may determine whether the version identifier associated with the modified value 104 is more recent or less recent than that associated with the precomputation process 116. In other implementations, the precomputation process 116 may simply be configured to determine the presence or absence of an expected version identifier associated with the modification process 108.

If the precomputation process 116 determines the updated version identifier, block 612 executes the precomputation process 116 to modify one or more additional values 104 based on the modified value 104. For example, determination of the updated version identifier associated with the modified value 104 may indicate that the modification process 108 previously acted on the value 104. Based on this determination, the precomputation process 116 may update values 104 dependent on the modified value 104 by recalculating the dependent values 104 based on the current, modified value 104 associated with the modification process 108.

If the precomputation process 116 does not determine the updated version identifier, block 614 defers execution of the precomputation process 116 for a length of time corresponding to a process time associated with the modification process 108. For example, the precomputation process 116 may be enqueued a subsequent time for future access to the database 102. In some implementations, the precomputation process 116 may be enqueued in a separate queue configured to contain deferred processes. The length of time the precomputation process 116 is deferred may correspond to an expected length of time for enqueuing or execution of the modification process 108.

Block 616 determines whether the updated version identifier was determined, subsequent to the length of time, by the precomputation process 116. When the precomputation process 116 is again granted access to the database 102, it may access the value 104 that was to be modified by the modification process 108 to determine the version identifier associated therewith. If the precomputation process 116 determines the updated version identifier, this determination may indicate that the modification process 108 was executed to modify the value 104 during the time that the precomputation process 116 was deferred. Responsive to this determination, block 612 may be performed, and the precomputation process 116 may be executed to modify one or more additional values 104 based on the modified value 104.

If the updated version identifier is not determined by the precomputation process 116, the modification process 108 may have failed. Block 618 executes the precomputation process 116 to modify one or more additional values 104 based on the unmodified value 104. Because the precomputation process 116 performs modifications based on the current (e.g., unmodified) status of the value 104, the values 104 in the database 102 do not become inaccurate. In other implementations, the precomputation process 116 may fail rather than performing modifications based on the unmodified value 104.

Figure 7:
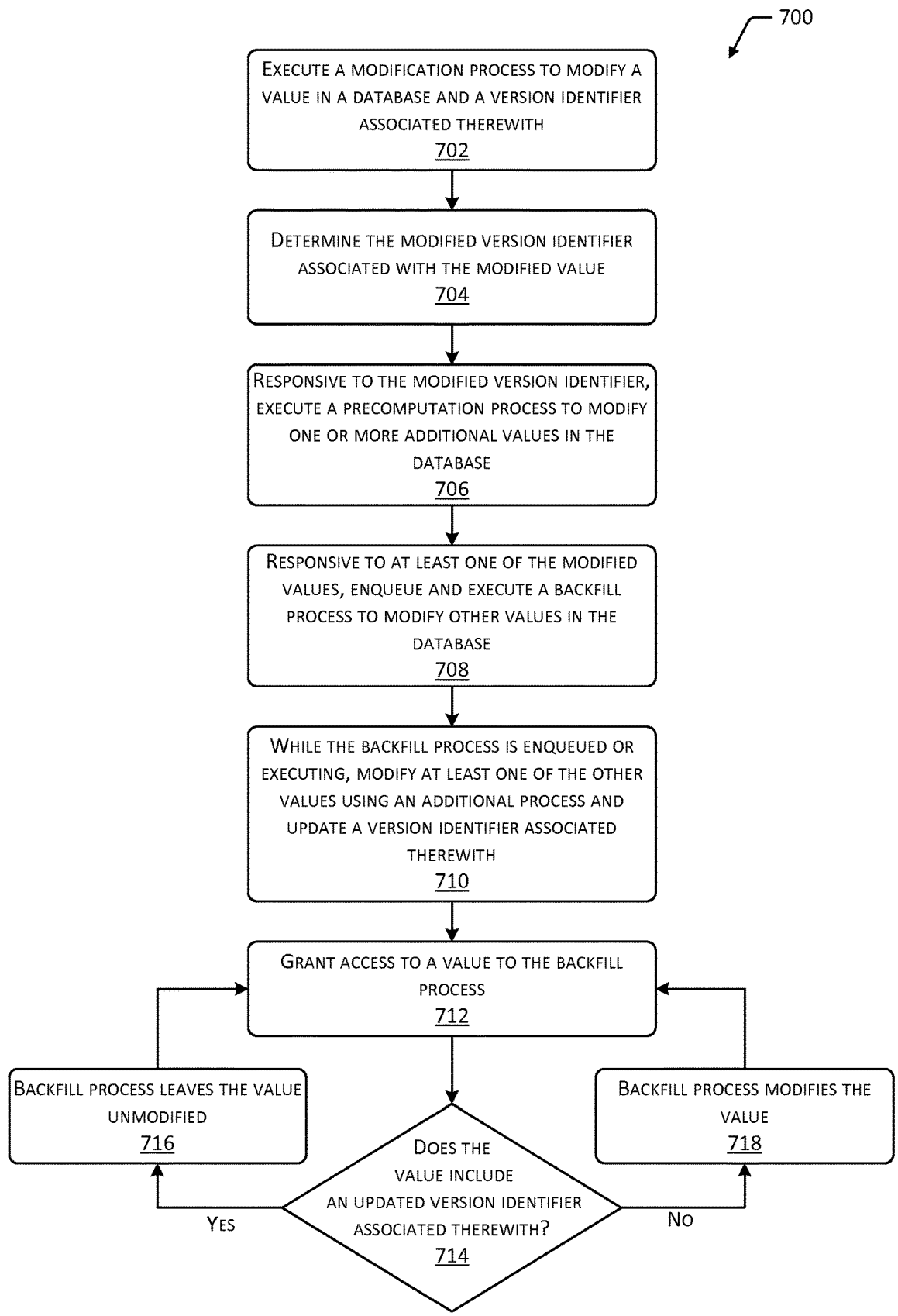
FIG. 7 is a flow diagram illustrating a method for executing a backfill process and determining one or more values to remain unmodified due to modification thereof by a more recent process.

FIG. 7 is a flow diagram 700 illustrating a method for executing a backfill process and determining one or more values 104 to remain unmodified due to modification thereof by a more recent process. A backfill process may be manually executed or automatically triggered to modify one or more values 104 in a database 102 responsive to the modification of a value 104 that may affect one or more other values 104. For example, modification of a value 104 representative of a sales tax rate for a particular region may affect every value 104 representing a precomputed sales price that includes sales tax for items sold in that region. As another example, modification of a value 104 representative of a fraud status of a vendor may affect every value 104 associated with an item sold by that vendor. As such, a backfill process may be used to recalculate potentially large numbers of values 104 when a source value 104 that affects numerous other values 104 is modified. In some implementations, a backfill process may recalculate all or a portion of values 104 within a database 102 independent of the relationship of each value 104 to the modified value 104. Because a backfill process may require significant time and computational resources, backfill processes may be enqueued on a separate queue configured to contain backfill processes. One or more priority rules may be used to determine when processes from the backfill queue are executed in lieu of other processes attempting to access the database(s) 102. In some implementations, to conserve time, computational resources, and prevent the backfill process from generating inaccurate values 104 in a database 102, the backfill process may be configured to determine whether modification of one or more particular values 104 is necessary based on version identifiers associated therewith.

Block 702 executes a modification process 108 to modify a value 104 in a database 102 and a version identifier associated therewith. Block 704 determines the modified version identifier associated with the modified value 104. For example, a precomputation process 116 may access the modified value 104 prior to execution thereof to determine the version identifier and confirm whether the value 104 was modified by the modification process 108. Block 706 executes the precomputation process 116, responsive to the modified version identifier, to modify one or more additional values 104 in the database 102.

In the depicted implementation, one or more of the values 104 modified by the modification process 108 or the precomputation process 116 may be a source value 104 that affects one or more other values 104 in the database 102. Block 708 enqueues and executes a backfill process to modify other values 104 in the database 102, responsive to at least one of the modified values 104. The backfill process may be configured to recalculate all or a portion of the values 104 in the database 102. In some implementations, one or more filters may be applied to the backfill process.

For example, the backfill process may be restricted to recalculating certain types of values 104, values 104 having certain flags or categories, and so forth.

In block 710, while the backfill process is enqueued or executing, at least one of the other values may be modified using an additional process, and the version identifier associated therewith may be updated. For example, while a backfill process is generated and enqueued on a backfill queue, one or more modification processes 108 or precomputation processes 116 may be generated, enqueued, and executed. The additional process(es) may modify values 104 that the backfill process is configured to modify. Because the additional process(es) were generated and executed subsequent to the time that the backfill process was generated, the values 104 modified by the additional process(es) may be more current than or identical to the modified values 104 that will be generated by the backfill process when executed.

Block 712 grants the backfill process access to a value 104. To conserve time, computational resources, and prevent the backfill process from creating inaccurate values 104 or overwriting identical values 104 in the database 102, the backfill process may determine the version identifier associated with the accessed value 104. In some implementations, the backfill process may have a version identifier associated therewith, and the backfill process may be configured to determine whether the version identifier associated with the value 104 is more or less recent than the version identifier associated with the backfill process. In other implementations, the backfill process may be configured to detect the presence or absence of an expected version identifier. For example, the backfill process may be configured to access a value 104, determine the version identifier associated with that value 104, and compare the determined version identifier to an expected version identifier.

Block 714 determines whether the value 104 includes an updated version identifier. The presence of an updated version identifier may indicate that the value 104 was modified by a process subsequent to the generation of the backfill process. As such, modification of that value 104 by the backfill process may unnecessarily consume time and computation resources to generate an identical value 104. Block 716 indicates the backfill process leaving the value 104 unmodified when it is determined that the value 104 includes an updated, associated version identifier. The backfill process may then access a subsequent value 104, as indicated in block 712. If the value 104 does not include an updated version identifier associated therewith, then the backfill process may modify the value 104, as indicated in block 718. The backfill process may then access a subsequent value 104, as indicated in block 712.

The processes discussed herein may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more non-transitory computer-readable storage media storing a plurality of values and computer-executable instructions; and
a hardware processor configured to execute the computer-executable instructions to:
  receive a modification to a first value of the plurality of values;
  generate a modification process to determine a modified first value based at least in part on the modification;
  determine a second value of the plurality of values that is calculated using the modified first value;
  determine the modified first value is available for access;
  based on the modified first value being available for access, generate a precomputation process configured to modify the second value based at least in part on the modified first value;
  enqueue the precomputation process for access to the one or more non-transitory computer-readable storage media;

receive confirmation data indicating that the precomputation process has been enqueued for access to the one or more non-transitory computer-readable storage media to modify the second value that is calculated using the modified first value to generate a modified second value;

subsequent to receiving the confirmation data, execute the modification process to access the modified first value based at least in part on the modification;

execute the precomputation process to modify the second value that is calculated using the modified first value to generate the modified second value to maintain accurate values in the plurality of values; and update, the plurality of values, by replacing the second value with the modified second value.

2. The system of claim 1, further comprising computer-executable instructions to:

receive second confirmation data indicating the modification of the first value;

responsive to the second confirmation data, generate a backfill process configured to recalculate the plurality of values based at least in part on the modification of the first value;

enqueue the backfill process for access to the one or more non-transitory computer-readable storage media; and modify at least one additional value of the plurality of values based at least in part on the modification to the first value.

3. The system of claim 1, wherein the computer-executable instructions to enqueue the precomputation process for access to the one or more non-transitory computer-readable storage media comprise computer-executable instructions to:

determine a partition of the one or more non-transitory computer-readable storage media assigned to the precomputation process;

determine a lock associated with the partition;

determine a host device to which the lock has been assigned; and provide the precomputation process to the host device;

wherein the confirmation data is received from the host device.

4. The system of claim 1, further comprising computer-executable instructions to:

assign a version identifier to the modification to the first value; and assign the version identifier to the precomputation process, wherein the computer-executable instructions to execute the modification process to modify the first value comprise computer-executable instructions to:

store the version identifier in association with the modified first value, and wherein the computer-executable instructions to execute the precomputation process to modify the second value of the plurality of values comprise computer-executable instructions to:

determine the version identifier associated with the modified first value; and determine correspondence between the version identifier associated with the modified first value and the version identifier assigned to the precomputation process.

5. A method comprising:

receiving, from a first device, data indicative of a first value of a plurality of values modified by a first process performed by the first device to generate a modified first value;

determining a second value of the plurality of values that is calculated using the modified first value;

enqueuing a second process for access to a non-transitory computer-readable storage medium;

receiving confirmation data indicating that the second process has been enqueued for access to the non-transitory computer-readable storage medium;

subsequent to receiving the confirmation data, enqueuing the second process for access to the non-transitory computer-readable storage medium, wherein the second process is configured to modify the second value that is calculated using the modified first value to generate a modified second value and to assign a version identifier to the modified second value;

determining assignment of the version identifier to the modified second value;

in response to the assignment of the version identifier to the modified second value, executing the second process to modify the second value that is calculated using the modified first value to generate the modified second value to maintain accurate values in the plurality of values; and updating the plurality of values by replacing the second value with the modified second value.

6. The method of claim 5, the method further comprising:

determining at least one additional value that is calculated using the modified first value; and generating the second process based at least in part on the determination of the at least one additional value, wherein the second process is configured to modify the at least one additional value.

7. The method of claim 5, wherein the second process is further configured to modify at least one additional value, the method further comprising:

determining a failure to modify the at least one additional value; and retrying execution of the second process on the non-transitory computer-readable storage medium until the at least one additional value is modified.

8. The method of claim 5, the method further comprising:

enqueuing a backfill process for access to the non-transitory computer-readable storage medium, wherein the backfill process is configured to access one or more additional values in the non-transitory computer-readable storage medium and determine a relationship between the one or more additional values and the modified first value; and modifying at least one additional value of the one or more additional values based at least in part on the modified first value.

9. The method of claim 8, wherein one or more of enqueuing the first process or enqueuing the second process comprises generating queue data indicative of one or more of the first process or the second process in a first queue associated with the non-transitory computer-readable storage medium, and wherein enqueuing the backfill process comprises generating queue data indicative of the backfill process in a second queue associated with the non-transitory computer-readable storage medium, the method further comprising:

accessing a priority rule indicative of a priority corresponding to one or more of the first queue or the second queue; and executing one or more of the first process, the second process, or the backfill process in an order based at least in part on the priority rule.

10. The method of claim 5, the method further comprising:

enqueuing a backfill process for access to the non-transitory computer-readable storage medium, wherein the backfill process is configured to modify one or more values in the non-transitory computer-readable storage medium based at least in part on the modified first value, and wherein the backfill process comprises the version identifier associated therewith;

modifying at least one value of the one or more values;

assigning an additional version identifier to the at least one value; and determining a lack of correspondence between the additional version identifier assigned to the at least one value and the version identifier associated with the backfill process.

11. The method of claim 5, further comprising:

determining at least one output associated with the first process;

determining a partition of the non-transitory computer-readable storage medium assigned to the at least one output; and determining a host device associated with a lock corresponding to the partition, wherein enqueuing the first process for access to the non-transitory computer-readable storage medium comprises providing the first process to the host device.

12. A system comprising:

one or more non-transitory computer-readable storage media storing computer-executable instructions; and a hardware processor configured to execute the computer-executable instructions to:

receive data indicative of a first process from a first device, wherein the first process is configured to modify a first value of a plurality of values to generate a modified first value;

generate a second process based at least in part on the first process, the second process configured to modify a second value that is calculated using the modified first value, the second process generating a modified second value;

enqueue the second process for execution;

receive first confirmation data indicating that the second process has been enqueued for execution;

subsequent to receiving the first confirmation data, execute the second process to modify the second value that is calculated using the modified first value, the second process generating the modified second value to maintain accurate values in the plurality of values; and update the plurality of values by replacing the second value with the modified second value.

13. The system of claim 12, further comprising computer-executable instructions to:

determine the modified first value generated by the first process; and determine at least one additional value that is calculated using the modified first value, wherein the second process is generated to modify the at least one additional value based on the modified first value.

14. The system of claim 12, further comprising computer-executable instructions to:

receive second confirmation data indicating that the first process has been executed; and subsequent to receiving the second confirmation data, cause the first process to be executed.

15. The system of claim 12, further comprising computer-executable instructions to:

cause execution of the first process to modify the first value to generate the modified first value; and in response to execution of the first process, enqueue a backfill process to modify at least one additional value based on the modified first value.

16. The system of claim 12, further comprising computer-executable instructions to:

associate a version identifier to the second process;

cause execution of the first process to modify the first value to form the modified first value and to associate the version identifier with the modified first value;

determine correspondence between the version identifier associated with the second process and the version identifier associated with the modified first value; and in response to the correspondence, cause execution of the second process to modify at least one additional value based on the modified first value.

17. The system of claim 12, the system further comprising computer-executable instructions to:

enqueue a third process to modify the first value;

determine correspondence between the first process and the third process; and in response to the correspondence, remove the first process from a queue for execution.

18. The system of claim 12, the system further comprising computer-executable instructions to:

execute a third process to modify the first value and associate a first version identifier with the first value;

determine a lack of correspondence between the first version identifier and a second version identifier associated with the first process; and in response to the lack of correspondence, remove the first process from a queue for execution.

19. The system of claim 12, the system further comprising computer-executable instructions to:

determine that a first version identifier is associated with the modified first value;

delay execution of the second process for a length of time corresponding to a process time associated with the first process;

subsequent to the length of time, determine that a second version identifier is associated with the modified first value; and in response to the second version identifier, execute the second process.

20. The system of claim 12, wherein the second process is configured to modify at least one additional value of the plurality of values that is calculated using the modified first value.

* * * * *